(12) United States Patent
Kobata et al.

(10) Patent No.: US 11,908,375 B2
(45) Date of Patent: Feb. 20, 2024

(54) HEAD-UP DISPLAY CONTROL SYSTEM AND HEAD-UP DISPLAY DISPLAY METHOD

(71) Applicant: HONDA MOTOR CO., LTD., Tokyo (JP)

(72) Inventors: Seiji Kobata, Wako (JP); Yuya Obayashi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 204 days.

(21) Appl. No.: 17/580,108

(22) Filed: Jan. 20, 2022

(65) Prior Publication Data

US 2022/0238059 A1    Jul. 28, 2022

(30) Foreign Application Priority Data

Jan. 27, 2021    (JP) .................. 2021-010801

(51) Int. Cl.
*G09G 3/20*    (2006.01)
*G02B 27/01*    (2006.01)

(52) U.S. Cl.
CPC ....... *G09G 3/2092* (2013.01); *G02B 27/0101* (2013.01); *G02B 27/0179* (2013.01); *G09G 2340/0464* (2013.01); *G09G 2380/10* (2013.01)

(58) Field of Classification Search
CPC ......... G09G 3/2092; G09G 2340/0464; G09G 2380/10
See application file for complete search history.

(56) References Cited

U.S. PATENT DOCUMENTS

2020/0331512 A1    10/2020  Kobata et al.
2021/0174767 A1*   6/2021   Edgren .................. H04N 23/54

FOREIGN PATENT DOCUMENTS

JP    2019-189078 A    10/2019
JP    2020-175761 A    10/2020

OTHER PUBLICATIONS

English translation of JP-2019189078-A (Year: 2019).*
Office Action received in corresponding Japanese application No. 2021-010801 dated Aug. 23, 2022 with English translation (6 pages).

* cited by examiner

*Primary Examiner* — Grace Q Li
(74) *Attorney, Agent, or Firm* — Rankin, Hill & Clark LLP

(57) ABSTRACT

A head-up display device that is installed in a vehicle and displays display information in a position overlapping with a window, a terminal holder installed in the vicinity of the window in a vehicle interior, a mobile terminal installation detection unit that detects whether a mobile terminal is installed on the terminal holder, and a control unit that controls the head-up display device are provided, in which the head-up display device includes a display position change unit that changes a display position of the display information, and the control unit changes the display position from a first display position to a second display position when the installation of the mobile terminal is detected by the mobile terminal installation detection unit.

4 Claims, 5 Drawing Sheets

(S1<S2)

(S1<S2)

HEAD-UP DISPLAY CONTROL SYSTEM AND HEAD-UP DISPLAY DISPLAY METHOD

CROSS-REFERENCE TO RELATED APPLICATION

This application is based upon and claims priority from the Japanese Patent Application No. 2021-010801, filed on Jan. 27, 2021, the entire contents of which are incorporated herein by reference.

BACKGROUND

Technical Field

The present invention relates to a head-up display control system and a head-up display display method.

Related Art

For example, JP 2020-175761 A discloses a structure in which a display panel is installed on a back side of an eccentric steering wheel and in a front position of a driver's seat of an instrument panel.

The display panel is provided so as to be able to appropriately switch between display of a current driving status such as a vehicle speed, display of a navigation screen and the like by a switching operation of a changeover switch, for example.

SUMMARY

Conventionally, for example, there is known a vehicle provided with a head-up display (hereinafter, referred to as a head-up display (HUD) device) that displays an image regarding basic information for a driver on a front window.

In a case where a mobile terminal such as a tablet is installed on the back side of the eccentric steering wheel in place of the display panel disclosed in JP 2020-175761 A, for example, there is a risk that an installation region of the mobile terminal and a display region of the HUD device superimpose on each other depending on a size of the installed mobile terminal. In a case where a holder for a mobile terminal is installed on the instrument panel also, a similar problem might occur depending on the size of the mobile terminal installed on the holder.

The present invention is achieved in view of the above-described points, and an object thereof is to provide a head-up display control system and a head-up display display method capable of avoiding an installation region of a mobile terminal and a display region of a head-up display device from superimposing on each other.

In order to achieve the above-described object, the present invention is provided with a head-up display device that is installed in a vehicle and displays display information in a position overlapping with a window, a terminal holder installed in the vicinity of the window in a vehicle interior, a mobile terminal installation detection unit that detects whether a mobile terminal is installed on the terminal holder, and a control unit that controls the head-up display device, in which the head-up display device includes a display position change unit that changes a display position of the display information, and the control unit changes the display position from a first display position to a second display position when the installation of the mobile terminal is detected by the mobile terminal installation detection unit.

Furthermore, the present invention is a head-up display display method using the head-up display control system, the method provided with detecting, by the mobile terminal installation detection unit, whether the mobile terminal is installed on the terminal holder, and outputting, by a control unit, a display position change signal that changes a display position from the head-up display device to the head-up display device when the mobile terminal installation detection unit detects that the mobile terminal is installed on the terminal holder.

The present invention may realize a head-up display control system and a head-up display display method capable of avoiding an installation region of a mobile terminal and a display region of a head-up display device from superimposing on each other.

DETAILED DESCRIPTION

Figure 3:
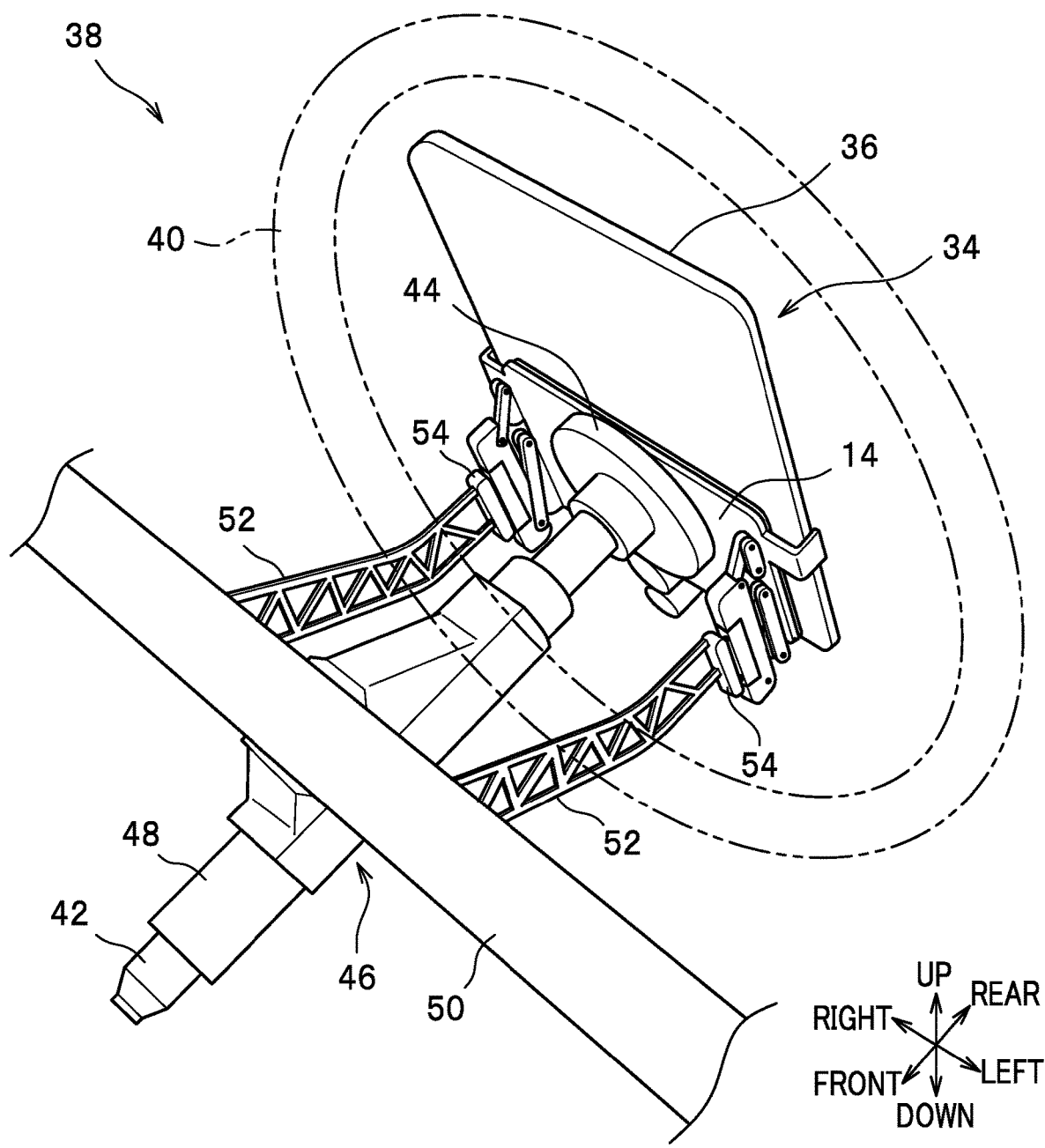
FIG. 3 is a partial virtual perspective view illustrating a state in which a mobile terminal is installed on a terminal holder illustrated in FIG. 1.
Figure 4A:
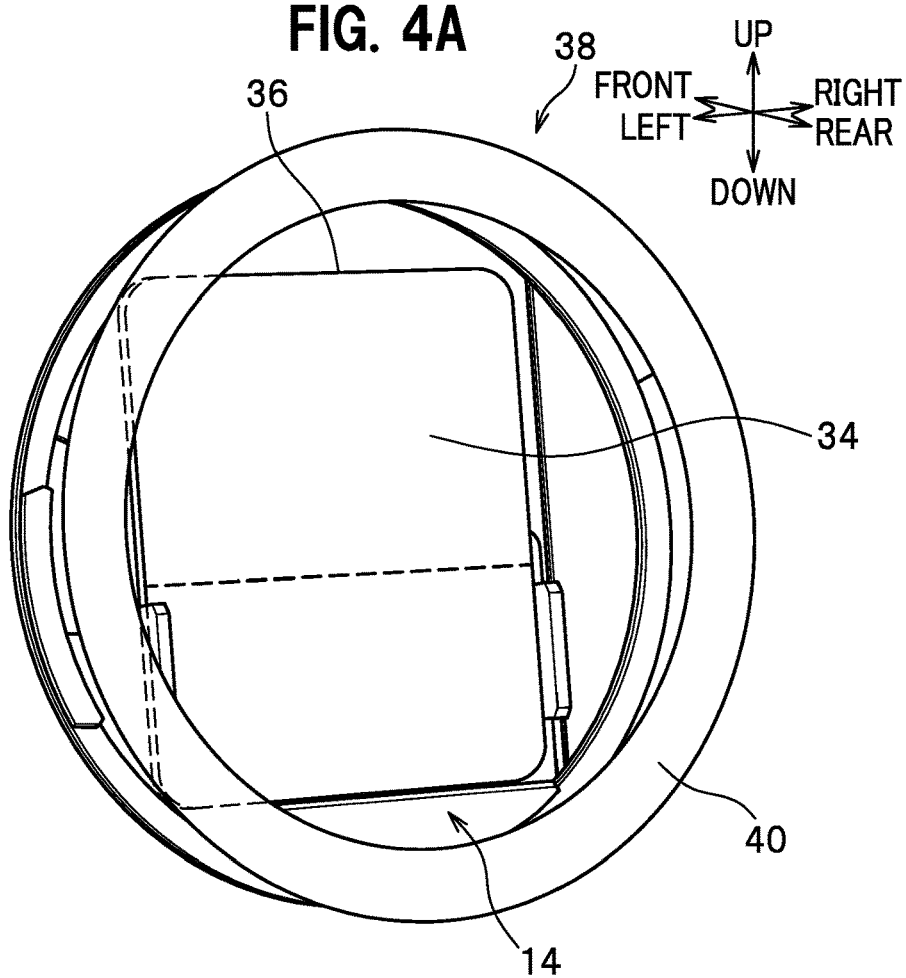
FIG. 4A is a perspective view illustrating a state in which the mobile terminal is installed on the terminal holder illustrated in FIG. 3.

Next, an embodiment of the present invention is described in detail with reference to the drawings as appropriate. In FIGS. 3 and 4A, "front/rear" indicates a vehicle front-and-rear direction, "right/left" indicates a vehicle width direction (right-and-left direction), and "up/down" indicates a vehicle up-and-down direction (vertical up-and-down direction).

Figure 1:
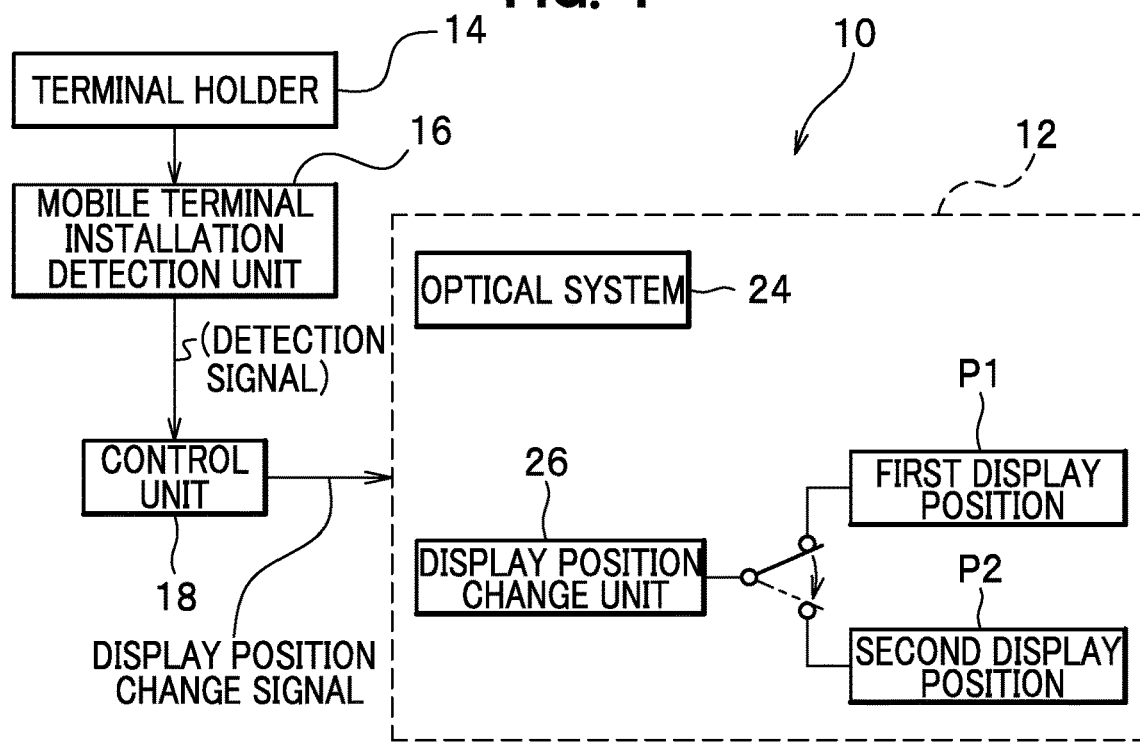
FIG. 1 is a block configuration diagram of a head-up display control system according to an embodiment of the present invention.

As illustrated in FIG. 1, a head-up display control system 10 according to an embodiment of the present invention is provided with a head-up display device 12 (hereinafter, referred to as a HUD device 12), a terminal holder 14, a mobile terminal installation detection unit 16, and a control unit 18.

The HUD device 12 displays display information such as, for example, a vehicle speed, a shift position, travel guidance, warning display, and an operation status of a drive support function in a position overlapping with a window. Specifically, for example, this is displayed on a lower side of a front window (window) 22 as a virtual image 20 so as to float in a vehicle front position with respect to a driver. The HUD device 12 includes an optical system 24 and a display position change unit 26 (refer to FIG. 1).

Figure 2:
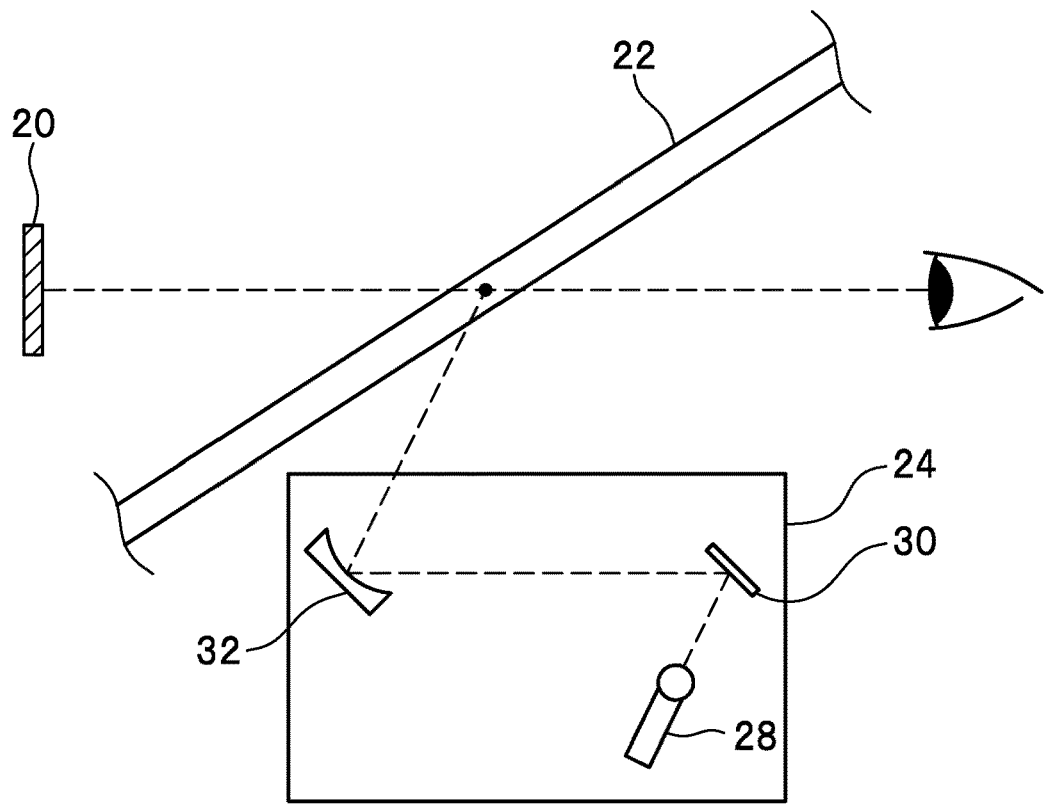
FIG. 2 is a schematic diagram illustrating a display principle of an optical system forming a head-up display device illustrated in FIG. 1.

As illustrated in FIG. 2, the optical system 24 is provided with a light source 28, a reflection mirror (plane mirror) 30, and concave mirror (magnifier) 32. The optical system 24 is mounted, for example, in a space on a back side of an instrument panel located on a vehicle front side with respect to the driver. The light source 28 is formed of, for example, a cold cathode tube or a light emitting diode, and outputs visible light corresponding to the virtual image 20 visually recognized by the driver. The visible light (information) emitted from the light source 28 is returned back by the reflection mirror 30 to be enlarged by the concave mirror 32. The display enlarged by the concave mirror 32 is reflected by the front window 22, and the driver may visually recognize the same as the virtual image 20.

The HUD device 12 includes the display position change unit 26 that changes a display position of the display information (virtual image 20) of the HUD device 12. The display position change unit 26 switches the display position of the virtual image 20 from a first display position P1, which is a normal display position of the virtual image 20 of the HUD device 12, to a second display position P2 to display the virtual image in another position not superimposed on the mobile terminal when the mobile terminal installation detection unit detects that the mobile terminal is installed on a terminal holder (P1→P2). Switching from the first display position P1 to the second display position P2 is performed by a switch mechanism illustrated in FIG. 1 or an actuator not illustrated that drives, the reflection mirror (plane mirror) 30 or the concave mirror (magnifier) 32, for example.

The terminal holder 14 is arranged in the vicinity of the front window 22 in a vehicle interior, on a rear side of the instrument panel, and on a back side (front side) of a steering wheel 40. As illustrated in FIG. 3, the terminal holder 14 supports a rear surface of a mobile terminal 36 including a display screen 34 on a front surface visible to the driver, so that the mobile terminal 36 is installed thereon.

The terminal holder 14 has a horizontally long rectangular shape in a horizontal direction as seen from a vehicle rear side, and is arranged behind the steering wheel 40 in an annular shape that forms a steering mechanism 38 of a vehicle (vehicle front side). The installed mobile terminal 36 is in a state in which the display screen 34 is exposed from the inside of the steering wheel 40 toward the vehicle rear side. That is, the mobile terminal 36 is installed on the terminal holder 14 in a state in which the driver may look straight at the display screen 34 inside the steering wheel 40. Both ends in the vehicle width direction of the terminal holder 14 are supported by a pair of arms 52 and 52 to be described later (refer to FIG. 3).

A shaft 42 is inserted into a cylindrical portion 48 extending in the vehicle front-and-rear direction of a steering hanger 46. A rod (steering hanger pipe) 50 of the steering hanger 46 is fixed above the cylindrical portion 48 so as to be orthogonal to the cylindrical portion 48. The rod 50 extends in the vehicle width direction, and the pair of arms 52 and 52 is fixed to positions equidistant from a position orthogonal to the cylindrical portion 48 to both right and left sides.

Each arm 52 protrudes to extend to the vehicle front side. The terminal holder 14 is supported by support units 54 and 54 at distal ends of the pair of extending arms 52 and 52. A disk 44 is fixed to a distal end of the shaft 42 on a side opposite to the cylindrical portion 48. The disk 44 is arranged so as to be spaced apart from the terminal holder 14 with a clearance therebetween.

Figure 4B:
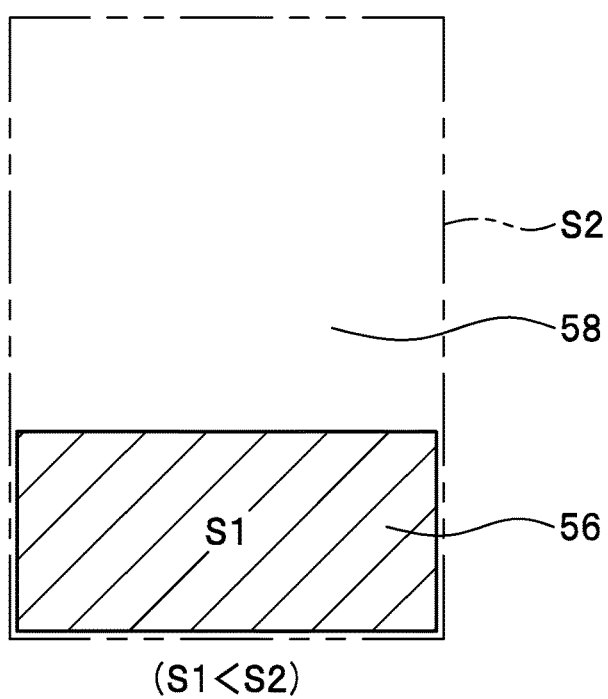
FIG. 4B is an illustrative view illustrating a relationship between an area of a holder projection region obtained by projecting the terminal holder illustrated in FIG. 4A and an area of a terminal projection region obtained by projecting the mobile terminal illustrated in FIG. 4A.

In a case where the mobile terminal 36 is installed on the terminal holder 14 as illustrated in FIG. 4A, an area (S1) of a holder projection region 56 obtained by projecting the terminal holder 14 onto a plane parallel to the display screen 34 of the mobile terminal 36 is smaller than an area (S2) of a terminal projection region 58 obtained by projecting the mobile terminal 36 onto the plane (S1<S2) (refer to FIG. 4B).

Figure 5A:
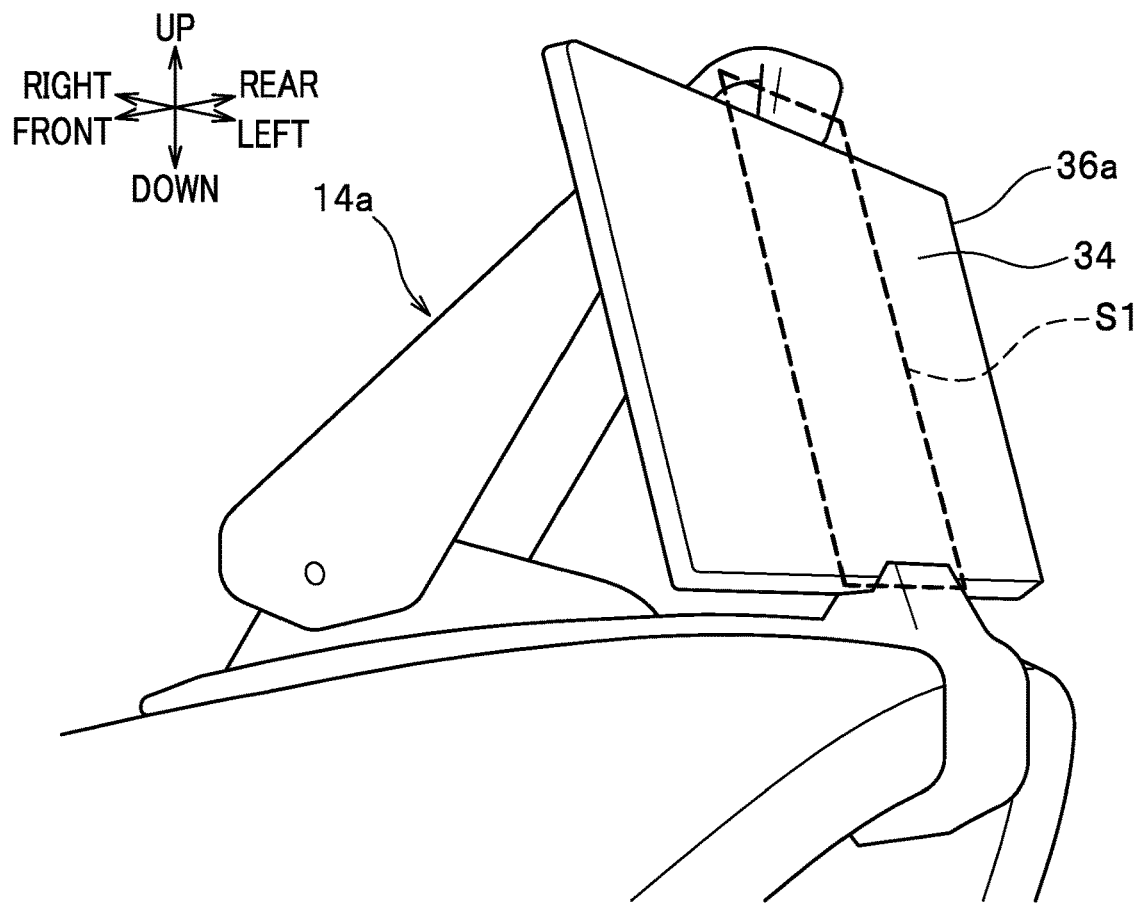
FIG. 5A is a perspective view illustrating a state in which another mobile terminal is installed on another terminal holder.
Figure 5B:
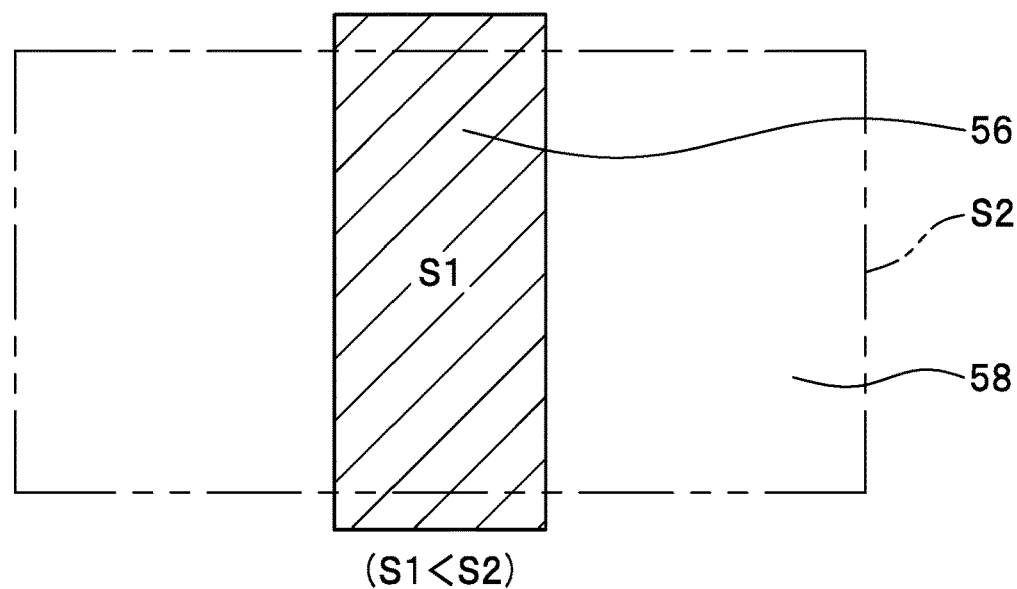
FIG. 5B is an illustrative view illustrating a relationship between the area of the holder projection region obtained by projecting the other terminal holder and the area of the terminal projection region obtained by projecting the other mobile terminal.

The same applies to a case where another mobile terminal 36a is installed on another terminal holder 14a fixed onto the instrument panel so as to be gripped in an up-and-down direction as illustrated in FIG. 5A. That is, the area (S1) of the holder projection region 56 obtained by projecting the terminal holder 14a onto the plane parallel to the display screen 34 of the mobile terminal 36a is smaller than the area (S2) of the terminal projection region 58 obtained by projecting the mobile terminal 36a onto the plane (S1<S2) (refer to FIG. 5B).

Figure 6A:
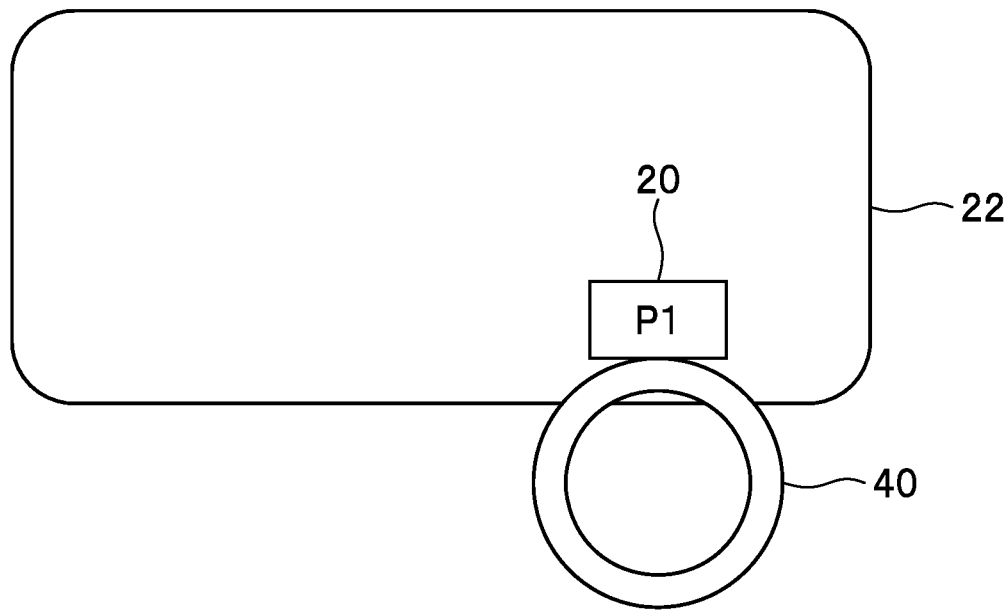
FIG. 6A is a schematic diagram illustrating a first display position of a virtual image of the head-up display device in a state in which the mobile terminal is not installed on the terminal holder.
Figure 6B:
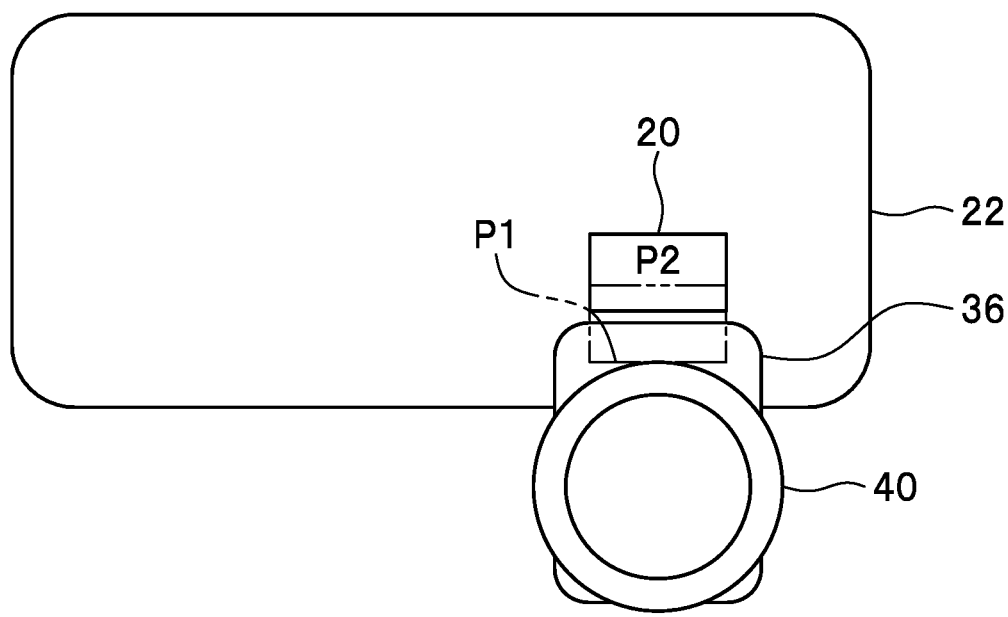
FIG. 6B is a schematic diagram illustrating a second display position of the virtual image of the head-up display device in a state in which the mobile terminal is installed on the terminal holder.

The first display position P1 is a position that does not overlap with the holder projection region 56 in the vehicle front-and-rear direction but overlaps with the terminal projection region 58 (refer to FIGS. 6A and 4B). The second display position P2 is a position that does not overlap with the holder projection region 56 or the terminal projection region 58 in the vehicle front-and-rear direction (refer to FIGS. 6B and 4B).

The first display position P1 and the second display position P2 may be manually set in advance by an operator, for example, or it is possible to detect a size of the mobile terminal 36 by an imaging sensor not illustrated installed in the vehicle, and the control unit 18 automatically determines the second display position P2 using detection information thereof.

The mobile terminal installation detection unit 16 detects whether the mobile terminal 36 is installed on the terminal holder 14. The mobile terminal installation detection unit 16 includes, for example, one that detects installation by a mechanical means and one that detects installation by an electric means or a magnetic means such as a sensor. As the mechanical means, for example, a switch mechanism may be provided in which a plate spring not illustrated having conductivity is mounted on a front surface of the terminal holder 14 in contact with the rear surface of the mobile terminal 36 or a lower surface of the terminal holder 14 in contact with a lower surface of the mobile terminal 36, and the plate spring is elastically deformed by being pressed by the mobile terminal 36 installed on the terminal holder 14 to be brought into contact with a conductive metal plate arranged in the vicinity of the plate spring, so that a switch is switched from an off state to an on state.

As the electric means, for example, a proximity switch (proximity sensor) and the like not illustrated may be mounted on the terminal holder 14, and the installation of the mobile terminal 36 on the terminal holder 14 may be detected by a detection signal output from the proximity switch.

The control unit 18 controls the HUD device 12. The control unit 18 changes the display position of the virtual image 20 of the HUD device 12 from the first display position P1 to the second display position P2 when the installation of the mobile terminal 36 is detected by the mobile terminal installation detection unit 16.

In this manner, when the installation of the mobile terminal 36 on the terminal holder 14 is detected by the mobile terminal installation detection unit 16, the control unit 18 may change the display position of the virtual image 20 in a direction away from the steering wheel 40.

The head-up display control system 10 according to this embodiment is basically configured as described above, and functions and effects thereof are next described.

First, in this embodiment, the mobile terminal installation detection unit 16 detects whether the mobile terminal 36 is installed on the terminal holder 14. In a state in which the mobile terminal 36 is not installed on the terminal holder 14, the display position of the virtual image 20 of the HUD device 12 is kept in the first display position P1, which is the normal position.

When the mobile terminal installation detection unit 16 detects that the mobile terminal 36 is installed on the terminal holder 14, the mobile terminal installation detection unit 16 outputs a detection signal to the control unit 18. When the detection signal is input to the control unit 18, the control unit 18 outputs a display position change signal that changes the display position of the virtual image 20 from the HUD device 12 from the first display position P1 to the second display position P2 to the HUD device 12. Accordingly, for example, the display position of the virtual image 20 of the HUD device 12 is switched from the first display position P1 on the lower side of the front window 22, which is the normal position, to the second display position P2 in which the virtual image 20 is displayed above the normal position.

As a result, in this embodiment, even in a case where the mobile terminal 36 is installed on the terminal holder 14, it is possible to suitably avoid an installation region of the mobile terminal 36 and a display region (virtual image 20) of the HUD device 12 from superimposing on each other.

Furthermore, in this embodiment, in a case where the mobile terminal 36 is installed on the terminal holder 14 as illustrated in FIG. 4A, the area (S1) of the holder projection region 56 obtained by projecting the terminal holder 14 onto the plane parallel to the display screen 34 of the mobile terminal 36 is smaller than the area (S2) of the terminal projection region 58 obtained by projecting the mobile terminal 36 onto the plane (S1<S2) (refer to FIG. 4B).

In this embodiment, before the installation of the mobile terminal 36 on the terminal holder 14, the area (S1) of the holder projection region 56 obtained by projecting the terminal holder 14 onto the plane parallel to the display screen 34 of the mobile terminal 36 is smaller than the area (S2) of the terminal projection region 58 obtained by projecting the mobile terminal 36 onto the plane, and is less likely to obstruct the display region of the virtual image 20 of the HUD device 12, so that the virtual image 20 of the HUD device 12 may be displayed in the normal position (refer to FIG. 6A). As a result, in this embodiment, the driver who visually recognizes both the virtual image 20 of the HUD device 12 displayed in the normal position (first display position) and the virtual image 20 of the HUD device 12 displayed in the second display position after position change is less likely to feel discomfort.

In this embodiment, the first display position P1 is a position that does not overlap with the holder projection region 56 in the vehicle front-and-rear direction but overlaps with the terminal projection region 58 (refer to FIGS. 6A and 4B). In this embodiment, the second display position P2 is a position that does not overlap with the holder projection region 56 or the terminal projection region 58 in the vehicle front-and-rear direction (refer to FIGS. 6B and 4B). Accordingly, in this embodiment, the driver who visually recognizes the virtual image 20 of the HUD device 12 displayed in the normal first display position P1 and the virtual image 20 of the HUD device 12 displayed in the second display position P2 after the position change is less likely to feel discomfort.

Furthermore, in this embodiment, the terminal holder 14 is arranged on the vehicle rear side with respect to the instrument panel and on the back side of the steering wheel 40. When the installation of the mobile terminal 36 on the terminal holder 14 is detected by the mobile terminal installation detection unit 16, the control unit 18 changes the display position of the virtual image 20 of the HUD device 12 in the direction away from the steering wheel 40.

In this embodiment, in the vehicle in which the mobile terminal 36 may be installed on the terminal holder 14 arranged on the vehicle rear side with respect to the instrument panel and on the back side of the steering wheel 40, the display position of the virtual image 20 of the HUD device 12 may be changed in the direction away from the steering wheel 40 when the mobile terminal 36 is installed on the terminal holder 14. As a result, in this embodiment, visibility of the driver who operates the steering mechanism 38 may be secured, and the visibility for the virtual image of the HUD device 12 may be further improved.

In this embodiment, a case where the virtual image 20 of the HUD device 12 is directly displayed on the front window 22 is illustrated as the "position overlapping with the window", but the present invention is not limited thereto, and for example, a case where the display information of the HUD device 12 is displayed on a half mirror not illustrated fixed onto the instrument panel and installed in front of the front window 22 is also included.

What is claimed is:

1. A head-up display control system comprising:
    a head-up display device that is installed in a vehicle and displays display information in a position overlapping with a window;
    a terminal holder installed in the vicinity of the window in a vehicle interior;
    a mobile terminal installation detection unit that detects whether a mobile terminal is installed on the terminal holder; and
    a control unit that controls the head-up display device, wherein
    the head-up display device includes a display position change unit that changes a display position of the display information, and
    the control unit changes the display position from a first display position to a second display position when the installation of the mobile terminal is detected by the mobile terminal installation detection unit,
    in a case where the mobile terminal is installed on the terminal holder, an area of a holder projection region obtained by projecting the terminal holder onto a plane parallel to a display screen of the mobile terminal is smaller than an area of a terminal projection region obtained by projecting the mobile terminal onto the plane,
    the first display position is a position that does not overlap with the holder projection region in a vehicle front-and-rear direction but overlaps with the terminal projection region, and
    the second display position is a position that does not overlap with the holder projection region or the terminal projection region in the vehicle front-and-rear direction.

2. The head-up display control system according to claim 1, wherein the window is a front window, the terminal holder is arranged on a vehicle rear side with respect to an instrument panel and on a back side of a steering wheel, and the control unit changes the display position in a direction away from the steering wheel when the installation of the mobile terminal on the terminal holder is detected by the mobile terminal installation detection unit.

3. A head-up display display method using the head-up display control system according to claim 2, the head-up display display method comprising:

detecting, by the mobile terminal installation detection unit, whether the mobile terminal is installed on the terminal holder; and outputting, by the control unit, a display position change signal that changes the display position from the first display position to the second display position when the mobile terminal installation detection unit detects that the mobile terminal is installed on the terminal holder.

4. A head-up display display method using the head-up display control system according to claim 1, the head-up display display method comprising:

detecting, by the mobile terminal installation detection unit, whether the mobile terminal is installed on the terminal holder; and outputting, by the control unit, a display position change signal that changes the display position from the first display position to the second display position when the mobile terminal installation detection unit detects that the mobile terminal is installed on the terminal holder.

* * * * *